United States Patent
Dong

(10) Patent No.: US 10,225,871 B2
(45) Date of Patent: Mar. 5, 2019

(54) METHOD AND SYSTEM FOR HOSTING NETWORK ACCESS POINT

(71) Applicant: Huawei Technologies Co., Ltd., Shenzhen, Guangdong (CN)

(72) Inventor: Mingjie Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 114 days.

(21) Appl. No.: 15/364,043

(22) Filed: Nov. 29, 2016

(65) Prior Publication Data

US 2017/0086235 A1 Mar. 23, 2017

Related U.S. Application Data

(63) Continuation of application No. PCT/CN2014/088340, filed on Oct. 11, 2014.

(30) Foreign Application Priority Data

May 30, 2014 (CN) .......................... 2014 1 0238716

(51) Int. Cl.
*H04L 29/12* (2006.01)
*H04W 12/06* (2009.01)
*H04W 8/18* (2009.01)
*H04W 76/11* (2018.01)
*H04W 88/08* (2009.01)

(52) U.S. Cl.
CPC ......... *H04W 76/11* (2018.02); *H04L 61/6022* (2013.01); *H04W 8/18* (2013.01); *H04W 12/06* (2013.01); *H04W 88/08* (2013.01)

(58) Field of Classification Search
CPC ....... H04W 8/18; H04W 12/06; H04W 76/02; H04W 76/021; H04W 76/11; H04W 88/08; H04L 29/12; H04L 61/6022
See application file for complete search history.

(56) References Cited

U.S. PATENT DOCUMENTS 6,795,700 B2 9/2004 Karaoguz et al.
8,023,425 B2 * 9/2011 Raleigh ............ G06Q 10/06375
370/252

(Continued)

FOREIGN PATENT DOCUMENTS

CN 102883327 A 1/2013
CN 103428671 A 12/2013
(Continued)

*Primary Examiner* — Tri H Phan

(57) ABSTRACT

A method, a terminal, and a system for hosting a network access point are disclosed, and relate to the communications filed. The method includes: initiating, by a terminal, a hosting request to a server, where the hosting request includes an identifier of an access point needing to be hosted, so that the server authenticates the access point according to the identifier of the access point, and the hosting request is used to delegate operation permission of the access point to the server; receiving, by the terminal, an authentication result sent by the server; and when the authentication result is that the authentication succeeds, determining, by the terminal, that the hosting succeeds. This application can effectively resolve a problem that a user has excessive network traffic, thereby improving user experience.

26 Claims, 8 Drawing Sheets

(56) References Cited

U.S. PATENT DOCUMENTS

| | | | |
|---|---|---|---|
| 8,270,310 B2* | 9/2012 | Raleigh | G06Q 10/06375 370/252 |
| 8,412,185 B2* | 4/2013 | Cader | H04M 3/58 370/353 |
| 8,437,271 B2* | 5/2013 | Raleigh | G06Q 10/06375 370/252 |
| 9,557,889 B2* | 1/2017 | Raleigh | G06F 3/0482 |
| 2006/0133409 A1* | 6/2006 | Prakash | H04L 12/2898 370/450 |
| 2007/0242657 A1 | 10/2007 | Waisman-Diamond | |
| 2009/0065572 A1* | 3/2009 | Jain | G06K 19/07739 235/379 |
| 2009/0290491 A1* | 11/2009 | Karagiannis | H04L 41/14 370/235 |
| 2009/0325581 A1* | 12/2009 | Lu | H04W 36/005 455/436 |
| 2013/0254394 A1 | 9/2013 | Kong et al. | |
| 2013/0297422 A1* | 11/2013 | Hunter | G06Q 30/0261 705/14.58 |

FOREIGN PATENT DOCUMENTS

| | | |
|---|---|---|
| CN | 103596121 A | 2/2014 |
| CN | 103701876 A | 4/2014 |
| CN | 103716793 A | 4/2014 |
| CN | 103747096 A | 4/2014 |

* cited by examiner

METHOD AND SYSTEM FOR HOSTING NETWORK ACCESS POINT

CROSS-REFERENCE TO RELATED APPLICATIONS

This application is a continuation of International Application No. PCT/CN2014/088340, filed on Oct. 11, 2014, which claims priority to Chinese Patent Application No. 201410238716.5, filed on May 30, 2014. The disclosures of the aforementioned applications are hereby incorporated by reference in their entireties.

TECHNICAL FIELD

The present invention relates to the communications field, and in particular, to a method and a system for hosting a network access point.

BACKGROUND

According to statistics, data traffic of one third of smartphones in the United States is processed by using Wi-Fi (Wireless-Fidelity) routers in 2012, and the percentage is expected to rise to 50% by 2017. That is, communication by means of Wi-Fi will become a mainstream of the world.

In real life, many users regularly buy network traffic from operators, but an embarrassing situation in which the network traffic cannot be used up and becomes invalid on a due date often occurs. In view of this problem, the prior art includes a traffic sharing method, and the method includes: establishing, by a terminal A, a network; and sending, by the terminal A, an access password to a terminal B within a network range of the terminal A, so that the terminal B can access the network established by the terminal A, and the terminal A can share the network of the terminal A.

It can be known from the above that, to share extra network traffic of the user with others, a user needs to take time and efforts to know a margin of network traffic of the user, and further needs to find a suitable object to share the traffic of the user. As a result, it is relatively inconvenient for the user to process the extra network traffic of the user.

SUMMARY

Embodiments of the present invention provide a method and a system for hosting a network access point. By means of the method provided in the solutions, a problem that a user has excessive network traffic can be resolved, so as to improve user experience.

A first aspect of the embodiments of the present invention discloses a method for hosting a network access point, where the method includes:

initiating, by a terminal, a hosting request to a server, where the hosting request includes an identifier of an access point needing to be hosted, so that the server authenticates the access point according to the identifier of the access point, and the hosting request is used to delegate operation permission of the access point to the server;

receiving, by the terminal, an authentication result sent by the server; and when the authentication result is that the authentication succeeds, determining, by the terminal, that the hosting succeeds.

With reference to the first aspect, in a first possible implementation manner of the first aspect, the hosting request further includes a first password, and the first password is used for access to the access point; and after the determining, by the terminal, that the hosting succeeds, the method further includes:

acquiring, by the terminal according to a preset time interval, a second password used to update the first password, where the second password is used for access to the access point; and sending, by the terminal, the identifier of the access point and the second password to the server, so that the server updates the first password according to the identifier of the access point and the second password.

With reference to the first aspect or the first possible implementation manner of the first aspect, in a second possible implementation manner of the first aspect, the hosting request further includes a hosting time period; and after the determining, by the terminal, that the hosting succeeds, the method further includes:

maintaining, by the terminal, a network sharing function of the access point in an enabled state within the hosting time period, so that the server can manage the access point within the hosting time period.

With reference to the first aspect or the first possible implementation manner of the first aspect or the second possible implementation manner of the first aspect, in a third possible implementation manner of the first aspect, the hosting request further includes a network traffic threshold; and after the determining, by the terminal, that the hosting succeeds, the method further includes:

collecting, by the terminal, statistics about network traffic shared by the access point; and when the shared network traffic is greater than or equal to the network traffic threshold, sending, by the terminal, a hosting stopping message to the server, so that the server stops managing the access point.

With reference to the first aspect or the first possible implementation manner of the first aspect or the second possible implementation manner of the first aspect or the third possible implementation manner of the first aspect, in a fourth possible implementation manner of the first aspect, the hosting request further includes a fund account; and after the determining, by the terminal, that the hosting succeeds, the method further includes:

receiving, by the terminal, a feedback message sent by the server, where the feedback message includes a network traffic consumption volume and funds transferred to the fund account, and the funds are funds corresponding to the network traffic consumption volume.

A second aspect of the embodiments of the present invention discloses another method for hosting a network access point, where the method includes:

receiving, by a server, a hosting request of a first terminal, where the hosting request includes an identifier of a first access point;

authenticating, by the server, the first access point according to the identifier of the first access point, and obtaining an authentication result; and sending, by the server, the authentication result to the first terminal.

With reference to the second aspect, in a first possible implementation manner of the second aspect, the hosting request further includes a first password, and the first password is used for access to the access point; and when the authentication result is that the authentication succeeds, after the sending, by the server, the authentication result to the first terminal, the method further includes:

receiving, by the server, the identifier of the first access point and a second password that are sent by the first terminal according to a preset time interval; and updating, by the server, the first password to the second password according to the identifier of the first access point.

With reference to the second aspect, in a second possible implementation manner of the second aspect, the hosting request further includes a first password, and the first password is used for access to the access point; and when the authentication result is that the authentication succeeds, after the sending, by the server, the authentication result to the first terminal, the method further includes:

generating, by the server, a second password according to a preset time interval, and updating the first password of the first terminal to the second password.

With reference to the second aspect or the first possible implementation manner of the second aspect or the second possible implementation manner of the second aspect, in a third possible implementation manner of the second aspect, the hosting request further includes a fund account; and after the sending, by the server, the authentication result to the first terminal, the method further includes:

collecting statistics about a network traffic consumption volume of the first access point;

calculating funds corresponding to the network traffic consumption volume; and transferring the funds to the fund account, and sending a message to the first terminal, where the message includes the network traffic consumption volume and the funds corresponding to the network traffic consumption volume.

With reference to the second aspect or the first possible implementation manner of the second aspect or the second possible implementation manner of the second aspect or the third possible implementation manner of the second aspect, in a fourth possible implementation manner of the second aspect, the hosting request further includes at least one of a hosting time period of the first access point and a network traffic threshold of the first access point; and the method further includes:

managing, by the server, the first access point according to the at least one of the hosting time period of the first access point and the network traffic threshold of the first access point.

With reference to the second aspect or the first possible implementation manner of the second aspect or the second possible implementation manner of the second aspect or the third possible implementation manner of the second aspect or the fourth possible implementation manner of the second aspect, in a fifth possible implementation manner of the second aspect, the method further includes: receiving, by the server, a query request sent by a second terminal, where the query request includes an identifier of a second access point, the identifier of the second access point is an identifier of an access point needing to be accessed by the second terminal, and the first access point may be the same as or may be different from the second access point;

querying, by the server, whether the identifier of the second access point is in an available state, and obtaining a query result; and sending the query result to the second terminal.

With reference to the fifth possible implementation manner of the second aspect, in a sixth possible implementation manner of the second aspect, the query request further includes an account and a password of the second terminal;

before the querying, by the server, whether the identifier of the second access point is in an available state, and obtaining a query result, the method further includes:

determining, by the server, whether the second terminal is a registered user according to the account and the password of the second terminal; and the querying, by the server, whether the second access point is in a hosting state according to the identifier of the second access point, and obtaining a query result includes:

when the second terminal is a registered user, querying, by the server, whether the identifier of the second access point is in the available state, and obtaining the query result.

With reference to the fifth possible implementation manner of the second aspect or the sixth possible implementation manner of the second aspect, in a seventh possible implementation manner of the second aspect, after the obtaining a query result, the method further includes:

when the query result is that the identifier of the second access point is in the available state, acquiring, by the server, the password of the second access point; and the sending, by the server, the query result to the second terminal includes:

sending, by the server, the password of the second access point to the second terminal, so that the second terminal accesses a network of the second access point according to the identifier of the second access point and the password of the second access point.

With reference to the seventh possible implementation manner of the second aspect, in an eighth possible implementation manner of the second aspect, the query request further includes a fund account of the second terminal; and after the sending, by the server, the password of the second access point to the second terminal, the method further includes:

collecting, by the server, statistics about a network traffic consumption volume of the second terminal;

calculating, according to the network traffic consumption volume of the second terminal, funds needing to be paid by the second terminal; and deducting the funds needing to be paid by the second terminal from the fund account of the second terminal.

With reference to the second aspect, in a ninth possible implementation manner of the second aspect, the method further includes: when the authentication result is that the authentication fails, sending, by the server, configuration information to the first terminal, so that the first terminal configures the access point according to the configuration information.

A third aspect of the embodiments of the present invention discloses another method for hosting a network access point, where the method includes:

acquiring, by a terminal, an identifier of an access point;

sending, by the terminal, a network access request message to a server, where the network access request message includes the identifier of the access point, so that the server queries whether the access point is in an available state according to the identifier of the access point;

receiving, by the terminal, a network access feedback message; and when the network access feedback message includes a password of the access point, connecting, by the terminal, to a network according to the identifier of the access point and the password of the access point.

With reference to the third aspect, in a first possible implementation manner of the third aspect, the network access request message includes a fund account; and after the connecting, by the terminal, to a network according to the identifier of the access point and the password, the method further includes:

receiving, by the terminal, a statistics collection message sent by the server, where the statistics collection message includes a network traffic consumption volume of the terminal and an amount deducted from the fund account, and the amount is funds corresponding to the network traffic consumption volume.

A fourth aspect of the embodiments of the present invention discloses a terminal, where the terminal includes:

a request unit, configured to initiate a hosting request to a server, where the hosting request includes an identifier of an access point needing to be hosted, so that the server authenticates the access point according to the identifier of the access point, and the hosting request is used to delegate operation permission of the access point to the server;

a receiving unit, configured to receive an authentication result sent by the server; and a determining unit, configured to: when the authentication result is that the authentication succeeds, determine that the hosting succeeds.

With reference to the fourth aspect, in a first possible implementation manner of the fourth aspect, the hosting request further includes a first password, and the first password is used for access to the access point; and the terminal further includes an updating unit and a sending unit, where the updating unit is configured to: when the determining unit determines that the hosting succeeds, acquire, according to a preset time interval, a second password used to update the first password, where the second password is used for access to the access point; and the sending unit is specifically configured to send the identifier and the second password obtained by the updating unit to the server, so that the server updates the first password according to the identifier and the second password.

With reference to the fourth aspect or the first possible implementation manner of the fourth aspect, in a second possible implementation manner of the fourth aspect, the hosting request further includes a hosting time period; and the terminal further includes a maintaining unit, where the maintaining unit is configured to: when the determining unit determines that the hosting succeeds, maintain a network sharing function of the access point in an enabled state, so that the server can manage the access point within the hosting time period.

With reference to the fourth aspect or the first possible implementation manner of the fourth aspect or the second possible implementation manner of the fourth aspect, in a third possible implementation manner of the fourth aspect, the hosting request further includes a network traffic threshold; and the terminal further includes a statistics collection unit and a termination unit, where the statistics collection unit is configured to: when the determining unit determines that the hosting succeeds, collect statistics about network traffic shared by the access point; and the termination unit is configured to: when the shared network traffic obtained by means of statistics collection by the statistics collection unit is greater than or equal to the network traffic threshold, send a hosting stopping message to the server, so that the server stops managing the access point.

With reference to the fourth aspect, or the first possible implementation manner of the fourth aspect, or the second possible implementation manner of the fourth aspect, or the third possible implementation manner of the fourth aspect, in a fourth possible implementation manner of the fourth aspect, the hosting request further includes a fund account; and the receiving unit is further configured to receive a feedback message sent by the server, where the feedback message includes a network traffic consumption volume and funds transferred to the fund account, and the funds are funds corresponding to the network traffic consumption volume.

A fifth aspect of the embodiments of the present invention discloses a server, where the server includes:

a receiving unit, configured to receive a hosting request of a first terminal, where the hosting request includes an identifier of a first access point;

an authentication unit, configured to authenticate the access point according to the identifier of the first access point that is received by the receiving unit, and obtain an authentication result; and a sending unit, configured to send the authentication result obtained by the authentication unit to the first terminal.

With reference to the fifth aspect, in a first possible implementation manner of the fifth aspect, the server further includes a first updating unit, where the receiving unit is further configured to: when the authentication result obtained by the authentication unit is that the authentication succeeds, and the sending unit completes sending of the authentication result to the first terminal, receive the identifier of the access point and a second password that are sent by the first terminal according to a preset time interval; and the first updating unit is configured to update the first password to the second password according to the identifier of the first access point that is received by the receiving unit.

With reference to the fifth aspect, in a second possible implementation manner of the fifth aspect, the server further includes a second updating unit, where the second updating unit is configured to: when the authentication result is that the authentication succeeds, and the sending unit completes sending of the authentication result to the first terminal, generate a second password according to a preset time interval, and update the first password of the first terminal to the second password.

With reference to the fifth aspect or the first possible implementation manner of the fifth aspect or the second possible implementation manner of the fifth aspect, in a third possible implementation manner of the fifth aspect, the hosting request further includes a fund account; and the server further includes a statistics collection unit, a calculation unit, and a settlement unit, where the statistics collection unit is configured to: when the sending unit completes the sending of the authentication result to the first terminal, collect statistics about a network traffic consumption volume of the first access point;

the calculation unit is configured to calculate funds that correspond to the network traffic consumption volume obtained by means of statistics collection by the statistics collection unit; and the settlement unit is configured to transfer the funds calculated by the calculation unit to the fund account, and send a message to the first terminal, where the message includes the network traffic consumption volume and the funds corresponding to the network traffic consumption volume.

With reference to the fifth aspect or the first possible implementation manner of the fifth aspect or the second possible implementation manner of the fifth aspect or the third possible implementation manner of the fifth aspect, in a fourth possible implementation manner of the fifth aspect, the hosting request further includes at least one of a hosting time period of the first access point and a network traffic threshold of the first access point; and the server further includes a management unit, where the management unit is configured to manage the access point according to the at least one of the hosting time period of the first access point and the network traffic threshold of the first access point that is received by the receiving unit.

With reference to the fifth aspect or the first possible implementation manner of the fifth aspect or the second possible implementation manner of the fifth aspect or the third possible implementation manner of the fifth aspect or the fourth possible implementation manner of the fifth aspect, in a fifth possible implementation manner of the fifth aspect, the server further includes a query unit, where the receiving unit is further configured to receive a query request sent by a second terminal, where the query request includes an identifier of a second access point, the identifier of the second access point is an identifier of an access point needing to be accessed by the second terminal, and the first access point may be the same as or may be different from the second access point; the query unit is configured to query whether the identifier of the second access point that is received by the receiving unit is in an available state, and obtain a query result; and the sending unit is further configured to send the query result obtained by the query unit to the second terminal.

With reference to the fifth possible implementation manner of the fifth aspect, in a sixth possible implementation manner of the fifth aspect, the query request further includes an account and a password of the second terminal; and the server further includes an identity authentication unit, where the identity authentication unit is configured to determine whether the second terminal is a registered user according to the account and the password of the second terminal that are received by the receiving unit; and the query unit is specifically configured to: when the identity authentication unit determines that the second terminal is a registered user, query, by the server, whether the identifier of the second access point is in the available state, and obtain the query result.

With reference to the fifth possible implementation manner of the fifth aspect or the sixth possible implementation manner of the fifth aspect, in a seventh possible implementation manner of the fifth aspect, the server further includes an acquiring unit, where the acquiring unit is further configured to: when the query result obtained by the query unit is that the identifier of the second access point is in the available state, acquire, by the server, the password of the second access point; and the sending unit is further configured to send the password of the second access point that is acquired by the acquiring unit to the second terminal, so that the second terminal accesses a network of the second access point according to the identifier of the second access point and the password of the second access point.

With reference to the seventh possible implementation manner of the fifth aspect, in an eighth possible implementation manner of the fifth aspect, the query request further includes a fund account of the second terminal;

the statistics collection unit is further configured to: when the sending unit completes sending of the password of the second access point to the second terminal, collect statistics about a network traffic consumption volume of the second terminal;

the calculation unit is further configured to calculate, according to the network traffic consumption volume of the second terminal that is obtained by means of statistics collection by the statistics collection unit, funds needing to be paid by the second terminal; and the settlement unit is further configured to deduct the funds that need to be paid by the second terminal and that are calculated by the calculation unit from the fund account of the second terminal.

With reference to the fifth aspect, in a ninth possible implementation manner of the fifth aspect, the sending unit is further configured to: when the authentication result obtained by the authentication unit is that the authentication fails, send configuration information to the first terminal, so that the first terminal configures the first access point according to the configuration information.

A sixth aspect of the embodiments of the present invention discloses a terminal, where the terminal includes:

an acquiring unit, configured to acquire an identifier of an access point;

a sending unit, configured to send a network access request message to a server, where the network access request message includes the identifier of the access point that is acquired by the acquiring unit, so that the server queries whether the access point is in an available state according to the identifier of the access point;

a receiving unit, configured to receive a network access feedback message; and a connection unit, configured to: when the network access feedback message received by the receiving unit includes a password of the access point, connect to a network according to the identifier of the access point and the password of the access point.

With reference to the sixth aspect, in a first possible implementation manner of the sixth aspect, the network access request message includes a fund account; and the receiving unit is further configured to: when the connection unit completes the network connection, receive a statistics collection message sent by the server, where the statistics collection message includes a network traffic consumption volume of the terminal and an amount deducted from the fund account, and the amount is funds corresponding to the network traffic consumption volume.

A seventh aspect of the embodiments of the present invention discloses a system for hosting a network access point, where the system includes:

the terminal according to any one of claim 17 to claim 22;

the server according to any one of claim 23 to claim 32; and the terminal according to claim 33 or 34.

It can be known from the above that, by means of the method and the system for hosting a network access point that are provided in the embodiments of the present invention, a terminal initiates a hosting request to a server, where the hosting request includes an identifier of an access point, so that the server authenticates the access point according to the identifier of the access point; the terminal receives an authentication result sent by the server; and when the authentication result is that the authentication succeeds, the terminal determines that the hosting succeeds, so that a user can host extra traffic to the server, which resolves a problem of having excessive network traffic; and the hosting operation is relatively simple, which improves user experience; and further, the terminal receives a feedback message sent by the server, where the feedback message includes a network traffic consumption volume and funds transferred to a fund account, and the funds are funds corresponding to the network traffic consumption volume, so that the extra traffic of the user is converted into funds, and a loss of the user is reduced.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
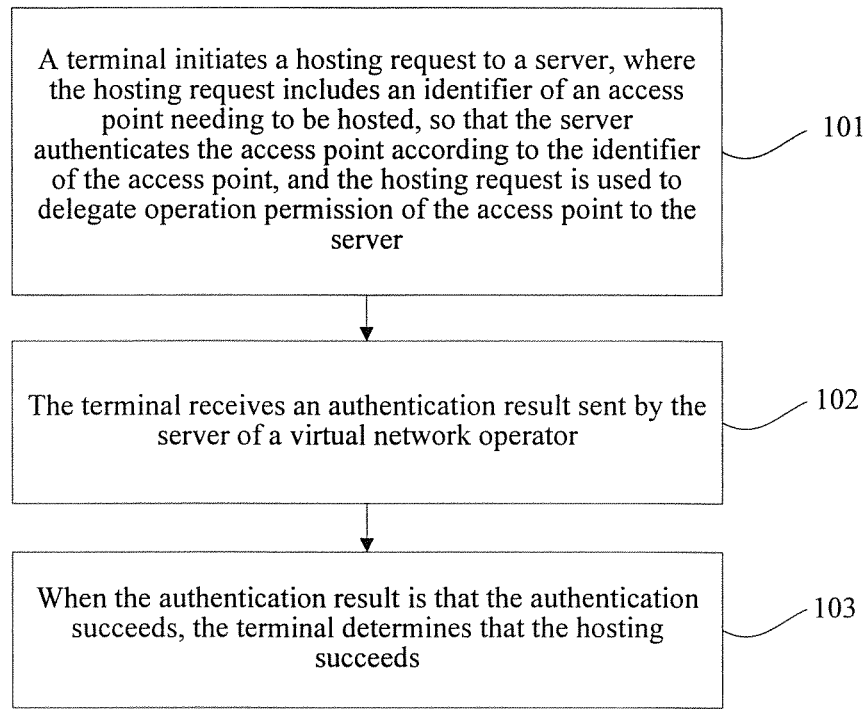
FIG. 1 is a flowchart of a method for hosting a network access point according to an embodiment of the present invention.

The following describes a method for hosting a network access point in an embodiment of the present invention according to FIG. 1. The method is applicable to a scenario in which a user has excessive network traffic and the network traffic cannot be used up within a specified time. The method specifically includes step 101 to step 103.

101: A terminal initiates a hosting request to a server, where the hosting request includes an identifier of an access point needing to be hosted, so that the server authenticates the access point according to the identifier of the access point, and the hosting request is used to delegate operation permission of the access point to the server.

The identifier of the access point includes a MAC (Medium access control, Media Access Control) address, a mobile phone number, or the like of the access point.

The terminal may be a smartphone whose hotspot function is enabled, or may be a computer, a tablet computer, or the like.

Before the terminal initiates the hosting request to the server, a user first needs to log in to the server, and also needs to be registered with the server before login.

Before the terminal initiates the hosting request to the server, the user first needs to log in to the server of a virtual network operator, and also needs to be registered with the server before login. After logging in according to a registered account and password, the user may select the access point needing to be hosted for hosting, or may bind, to the registered account, the AP needing to be hosted, so that as long as the account is logged in to later, the hosting request of the access point is automatically sent to the server of the virtual network operator.

102: The terminal receives an authentication result sent by the server.

103: When the authentication result is that the authentication succeeds, the terminal determines that the hosting succeeds.

That the authentication succeeds includes that the server determines that the identifier of the access point is valid.

In an embodiment of the present invention, if the identifier of the access point is a MAC address, the server may determine whether the identifier of the access point is valid by determining whether a length or a format of the MAC address is valid.

In another embodiment of the present invention, if the identifier of the access point is a mobile phone number, the server may determine whether the identifier of the access point is valid by determining whether the mobile phone number exits.

In another embodiment of the present invention, detection may be performed by using the MAC address, to determine whether the AP exists. If it is detected that the MAC address is reachable, the AP is considered to be valid.

When the authentication result is that the authentication fails, the terminal prompts the user, so that the user checks a password and the identifier of the access point needing to be hosted.

Optionally, the hosting request further includes a first password, and the first password is used for access to the access point; and after the determining, by the terminal, that the hosting succeeds, the method further includes:

acquiring, by the terminal according to a preset time interval, a second password used to update the first password, where the second password is used for access to the access point; and sending, by the terminal, the identifier of the access point and the second password to the server, so that the server updates the first password according to the identifier of the access point and the second password. The server of the virtual network operator determines whether a network of the access point can be connected by using the identifier of the access point and the first password, and authenticates the access point according to a determining result.

In an embodiment of the present invention, when a user finds a surrounding access point and wants to access the access point, the user sends a request for accessing the access point to the server, and the server sends a password of the access point to the user. If the user successfully connects to the access point by using the password, the server authenticates that the access point is successfully hosted.

The terminal updates the password of the access point according to the preset time interval, which can prevent the password of the access point from theft.

Optionally, the hosting request further includes a hosting time period; and after the determining, by the terminal, that the hosting succeeds, the method further includes:

maintaining, by the terminal, a network sharing function of the access point in an enabled state within the hosting time period, so that the server of the virtual network operator can manage the access point within the hosting time period.

The user may set the hosting time period according to a network use habit. For example, from 8 o'clock to 10 o'clock in the evening, if the user uses a network relatively frequently in this time period, the user may set that the access point is not hosted in this time period, so that a network speed can be ensured. For example, from 9 o'clock to 11 o'clock in the morning, if the user uses the network less frequently in this time period, the user may set the hosting time period to being from 9 o'clock to 11 o'clock in the morning.

The hosting request further includes a network traffic threshold; and after the determining, by the terminal, that the hosting succeeds, the method further includes:

collecting, by the terminal, statistics about network traffic shared by the access point; and when the shared network traffic is greater than or equal to the network traffic threshold, sending, by the terminal, a hosting stopping message to the server of the virtual network operator, so that the server of the virtual network operator stops managing the access point.

If the user has traffic of 1 G every month, but the user uses only 600 M, the user may host remaining 400 M, and set the network traffic threshold to 400 M.

The hosting request further includes a fund account; and after the determining, by the terminal, that the hosting succeeds, the method further includes:

receiving, by the terminal, a feedback message sent by the server, where the feedback message includes a network traffic consumption volume and funds transferred to the fund account, and the funds are funds corresponding to the network traffic consumption volume.

After the user hosts extra traffic, the user may obtain some rewards if the extra traffic is used. A specific amount of the rewards may be obtained according to a tariff standard of the virtual network operator.

It can be known from the above that, by means of the method for hosting a network access point that is provided in this embodiment of the present invention, a terminal initiates a hosting request to a server, where the hosting request includes an identifier of an access point needing to be hosted, so that the server authenticates the access point according to the identifier of the access point; the terminal receives an authentication result sent by the server; and when the authentication result is that the authentication succeeds, the terminal determines that the hosting succeeds. The terminal hosts extra network traffic to a virtual network operator for operating, which improves utilization of the network traffic, and also improves user experience.

Figure 2:
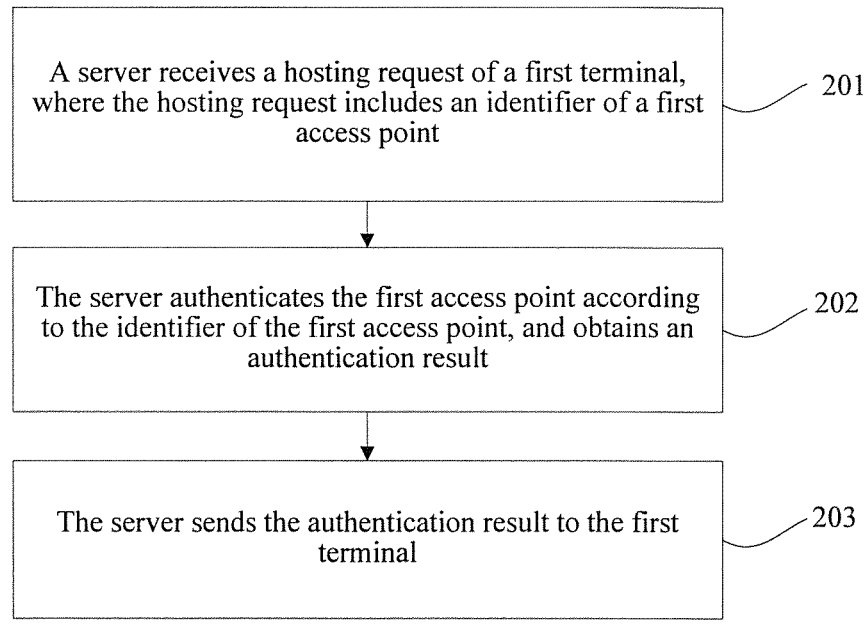
FIG. 2 is a flowchart of a method for hosting a network access point according to another embodiment of the present invention.

As shown in FIG. 2, FIG. 2 shows another embodiment of a method for hosting a network access point of the present invention. The method includes step 201 to step 203.

201: A server receives a hosting request of a first terminal, where the hosting request includes an identifier of a first access point.

An identifier can uniquely determine a network of one access point, and as long as an identifier of an access point and a password of the access point are determined, a network of the access point can be connected. The identifier corresponds to an SSID (Service Set Identification). For example, a user may enable a network search function of a smart device, and a network name displayed on a screen of the smart device is an SSID. Each SSID corresponds to one identifier. The user may change the SSID of the network of the access point at any time, but cannot change an identifier of the network.

The identifier of the access point may be a mobile phone number, or may be a MAC address or the like of the terminal.

202: The server authenticates the first access point according to the identifier of the first access point, and obtains an authentication result.

In another embodiment of the present invention, after receiving the identifier of the access point, the server may determine validity of the identifier of the access point. The identifier of the access point may be a MAC address or may be a mobile phone number or the like. Whether the identifier of the access point is valid is determined by determining a length or a format of the MAC address, or may be determined by using a length of the mobile phone number.

Optionally, the hosting request further includes a first password, and the first password is used for access to the access point; and when the authentication result is that the authentication succeeds, after the sending, by the server, the authentication result to the first terminal, the method further includes:

receiving, by the server, the identifier of the first access point and a second password that are sent by the first terminal according to a preset time interval; and updating, by the server, the first password to the second password according to the identifier of the first access point.

Optionally, the hosting request further includes a first password, and the first password is used for access to the access point; and when the authentication result is that the authentication succeeds, after the sending, by the server, the authentication result to the first terminal, the method further includes:

generating, by the server, a second password according to a preset time interval, and updating the first password of the first terminal to the second password.

In an embodiment of the present invention, the server may further authenticate the access point according to the identifier of the access point and the first password. When a user applies to access the access point, the server sends a password corresponding to the access point to the user. When the user successfully connects to the access point by using the password, the server determines that the authentication of the access point succeeds; or when the user cannot successfully connect to the access point by using the password, the server determines that the authentication of the access point fails.

The password of the access point is changed according to the preset time interval, which can avoid leakage of the password.

Optionally, the hosting request further includes a fund account; and after the sending, by the server, the authentication result to the first terminal, the method further includes:

collecting statistics about a network traffic consumption volume of the first access point;

calculating funds corresponding to the network traffic consumption volume; and transferring the funds to the fund account, and sending a message to the first terminal, where the message includes the network traffic consumption volume and the funds corresponding to the network traffic consumption volume.

The first terminal is a terminal hosting the access point.

The server needs to notify the first terminal of a use status of the hosted access point, where the use status of the access point specifically includes the network traffic consumption volume of the access point and an income brought by the network traffic consumption volume.

Optionally, the hosting request further includes at least one of a hosting time period of the first access point and a network traffic threshold of the first access point; and the method further includes:

managing, by the server, the first access point according to the at least one of the hosting time period of the first access point and the network traffic threshold of the first access point.

In an embodiment of the present invention, the server may put an access point that is currently within a hosting time period and whose used network traffic volume does not reach a network traffic threshold in one list, and put an access point that is not within a hosting time period or that reaches a network traffic threshold in one list, so that a state of an access point is queried for conveniently.

Optionally, the query request further includes an account and a password of the second terminal;

before the querying, by the server, whether the identifier of the second access point is in an available state, and obtaining a query result, the method further includes:

determining, by the server, whether the second terminal is a registered user according to the account and the password of the second terminal; and the querying, by the server, whether the second access point is in a hosting state according to the identifier of the second access point, and obtaining a query result includes:

when the second terminal is a registered user, querying, by the server, whether the identifier of the second access point is in the available state, and obtaining the query result.

When the server receives a request for applying to access an access point, the server needs to determine whether the requested access point is in an available state, for example, determine whether the requested access point is within a hosting time period and whether a network traffic threshold is reached. If the requested access point is within the hosting time period and the network traffic threshold is not reached, a password of the access point is sent to a requester, so that the requester joins a network of the access point according to the identifier and a password of the access point.

Optionally, after the obtaining a query result, the method further includes:

when the query result is that the identifier of the second access point is in the available state, acquiring, by the server, the password of the second access point; and the sending, by the server, the query result to the second terminal includes:

sending, by the server, the password of the second access point to the second terminal, so that the second terminal accesses a network of the second access point according to the identifier of the second access point and the password of the second access point.

Optionally, the query request further includes a fund account of the second terminal; and after the sending, by the server, the password of the second access point to the second terminal, the method further includes:

collecting, by the server, statistics about a network traffic consumption volume of the second terminal;

calculating, according to the network traffic consumption volume of the second terminal, funds needing to be paid by the second terminal; and deducting the funds needing to be paid by the second terminal from the fund account of the second terminal.

Optionally, when the authentication result is that the authentication fails, the server sends configuration information to the first terminal, so that the first terminal configures the access point according to the configuration information.

203: The server sends the authentication result to the first terminal.

It can be known from the above that, by means of the method for hosting a network access point that is provided in this embodiment of the present invention, a server receives a hosting request of a first terminal, where the hosting request includes an identifier of an access point needing to be hosted; the server authenticates the access point according to the identifier of the access point, and obtains an authentication result; and the server sends the authentication result to the access point. The terminal hosts extra network traffic to the server for operating, which improves utilization of the network traffic, and also improves user experience.

Figure 3:
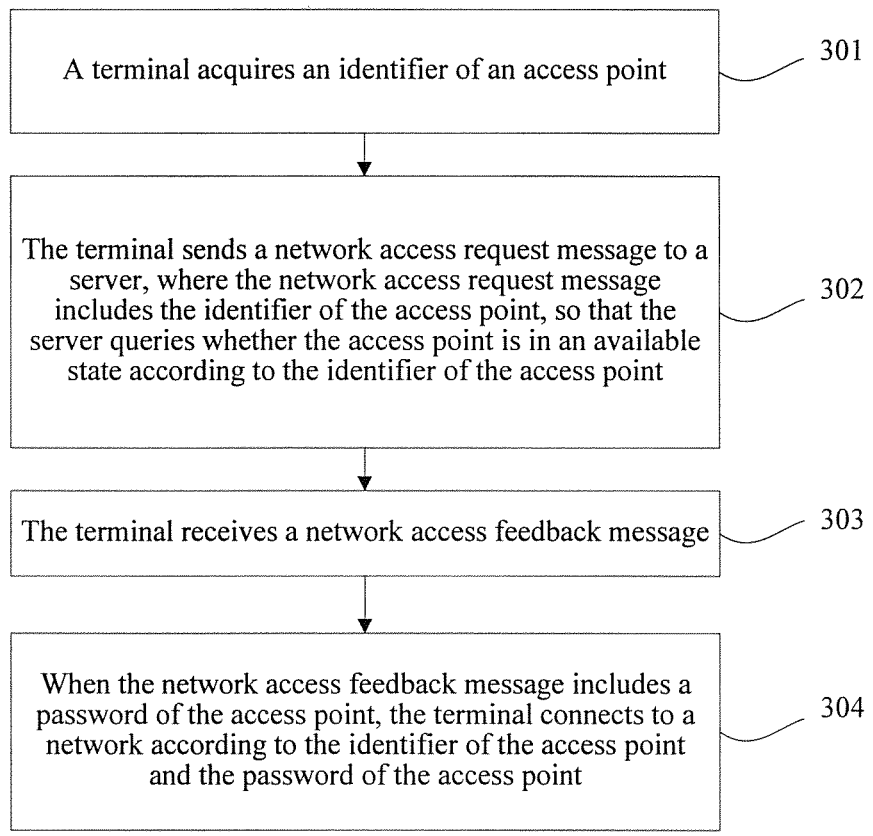
FIG. 3 is a flowchart of a method for hosting a network access point according to another embodiment of the present invention.

As shown in FIG. 3, FIG. 3 shows another embodiment of a method for hosting a network access point of the present invention. The method includes step 301 to step 304.

301: A terminal acquires an identifier of an access point.

The terminal may search for a surrounding network by using a network management function, so as to obtain an identifier of a found access point; or the terminal may obtain an identifier of an access point by scanning a two-dimensional barcode. There are still many methods to obtain the access point, which are not listed herein one by one.

302: The terminal sends a network access request message to a server, where the network access request message includes the identifier of the access point, so that the server queries whether the access point is in an available state according to the identifier of the access point.

The server determines, according to the identifier of the access point, whether the access point is within a hosting time period and whether network traffic consumption volume of the access point exceeds a network traffic threshold, and if the access point is within the hosting time period, and the network traffic consumption of the access point does not exceed the network traffic threshold, determines that the access point is in the available state.

303: The terminal receives a network access feedback message.

304: When the network access feedback message includes a password of the access point, the terminal connects to a network according to the identifier of the access point and the password of the access point.

Optionally, the network access request message includes a fund account; and after the connecting, by the terminal, to a network according to the identifier of the access point and the password, the method further includes:

receiving, by the terminal, a statistics collection message sent by the server, where the statistics collection message includes a network traffic consumption volume of the terminal and an amount deducted from the fund account, and the amount is funds corresponding to the network traffic consumption volume.

It can be known from the above that, by means of the method for hosting a network access point that is provided in this embodiment of the present invention, an application terminal may search, at any time, for an identifier of an access point needing to be accessed, send a network access request message to the server according to the identifier of the access point, and join a network by using a password fed back by the server, which therefore facilitates a life of the user, and improves user experience.

Figure 4:
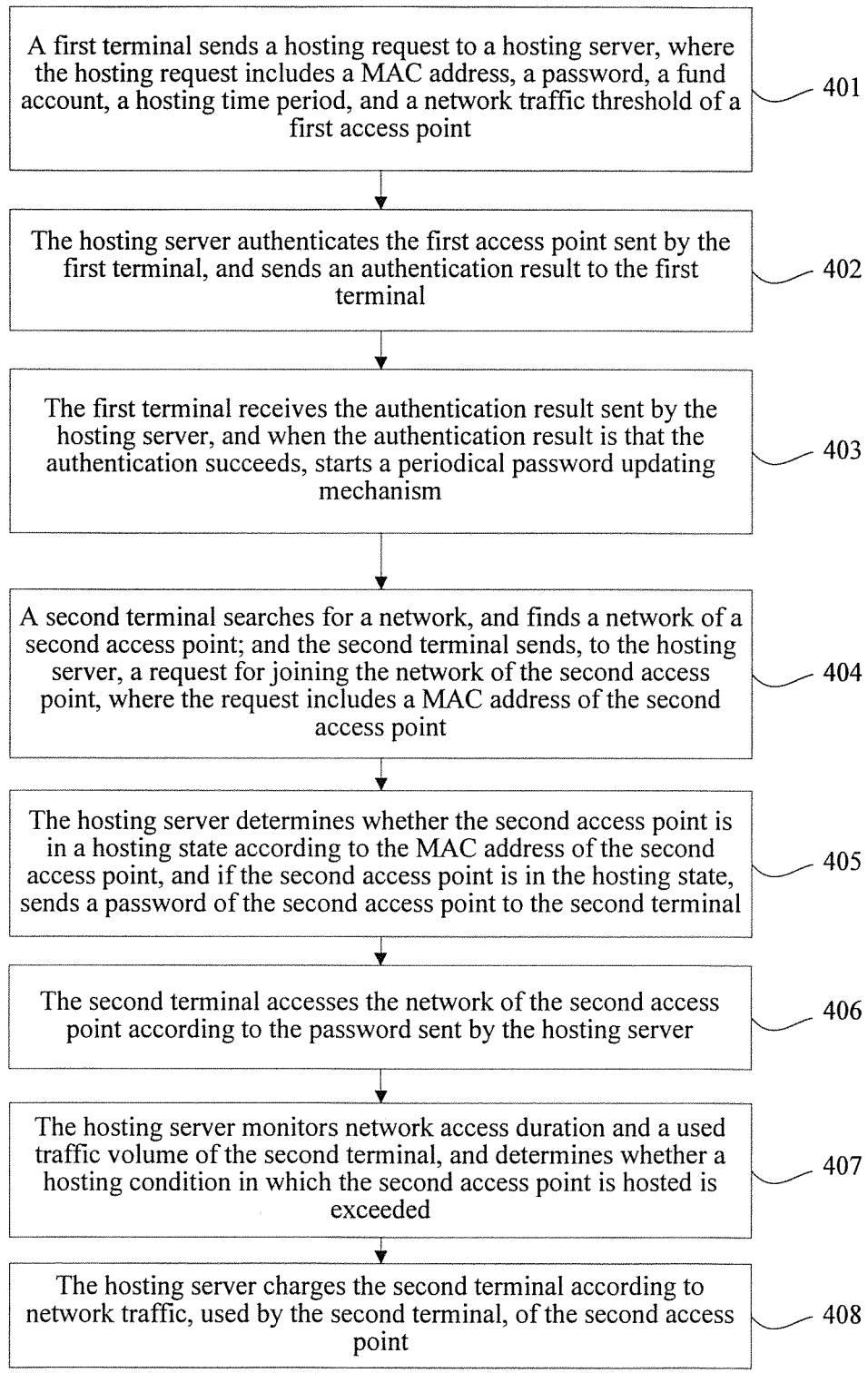
FIG. 4 is a flowchart of a method for hosting a network access point according to another embodiment of the present invention.

A specific implementation solution of the present invention is described in detail in an embodiment of the present invention, which is shown in FIG. 4:

401: A first terminal sends a hosting request to a hosting server, where the hosting request includes a MAC address, a password, a fund account, a hosting time period, and a network traffic threshold of a first access point.

The hosting server is a server of a virtual network operator.

The password of the first access point may be encrypted. The password of the first access point may also be sent in a form of a two-dimensional barcode, and when receiving the two-dimensional barcode, the hosting server scans the two-dimensional barcode and obtains the password.

402. The hosting server authenticates the first access point sent by the first terminal, and sends an authentication result to the first terminal.

The first access point requesting to be hosted is authenticated, and an authentication manner includes authenticating whether a format of the MAC address of the first access point is valid; or may include authenticating whether a network of the first access point can be connected by using the MAC address and the password of the first access point when a user requests to join the network of the first access point.

403: The first terminal receives the authentication result sent by the hosting server, and when the authentication result is that the authentication succeeds, starts a periodical password updating mechanism.

The periodical password updating mechanism is to update the password of the first access point according to a preset time interval, and send a new password of the first access point to the hosting server, so that the hosting server performs synchronous update.

404: A second terminal searches for a network, and finds a network of a second access point; and the second terminal sends, to the hosting server, a request for joining the network of the second access point, where the request includes a MAC address of the second access point, and the first access point may be the same as or may be different from the second access point.

The second terminal is an access point application terminal. Before sending, to the hosting server, the request for joining the network of the second access point, the second terminal needs to be registered with and log in to a hosting system.

405: The hosting server determines whether the second access point is in a hosting state according to the MAC address of the second access point, and if the second access point is in the hosting state, sends a password of the second access point to the second terminal.

The determining whether the second access point is in a hosting state includes: determining whether the second access point is within a hosting time period, and whether used network traffic reaches a network traffic threshold. When the second access point is within the hosting time period and the used network traffic does not reach the network traffic threshold, the second access point is in the hosting state.

406: The second terminal accesses the network of the second access point according to the password sent by the hosting server.

407: The hosting server monitors network access duration and a used traffic volume of the second terminal, and determines whether a hosting condition in which the second access point is hosted is exceeded.

The hosting server monitors an access status of the second terminal in real time, and determines whether a time that the second terminal accesses the network of the second access point exceeds the hosting time period, and whether the used network traffic is greater than the network traffic threshold.

408: The hosting server charges the second terminal according to network traffic, used by the second terminal, of the second access point.

A charging process includes: calculating, by the hosting server, amount payable according to the network traffic, used by the second terminal, of the second access point; then deducting the amount from a fund account of the second terminal; and calculating, by the hosting server from the deducted amount according to a preset allocation method, funds that should be paid to a user who applies to host the access point, and transferring the funds to the user who applies to host the access point.

Figure 5:
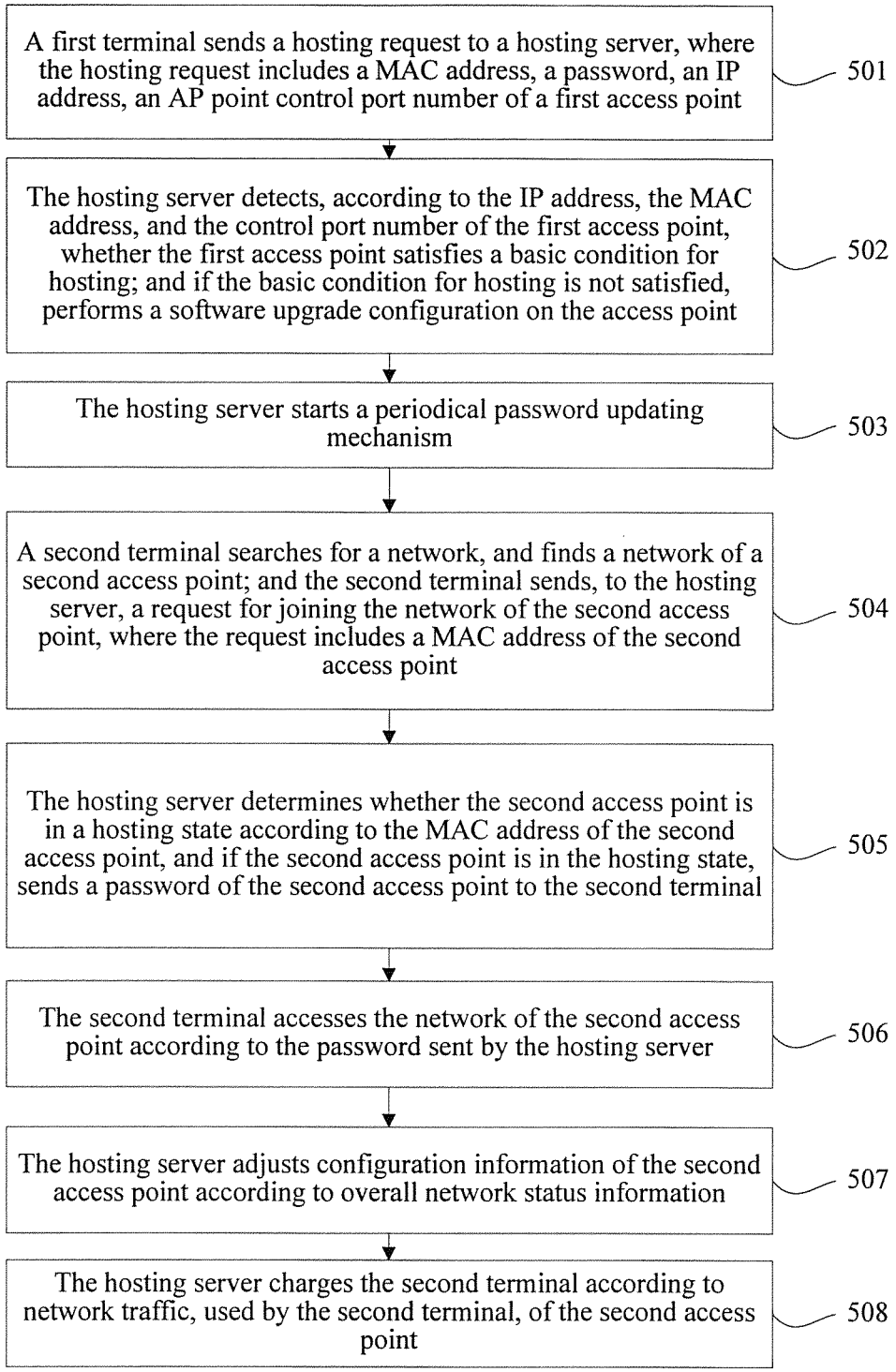
FIG. 5 is a flowchart of a method for hosting a network access point according to another embodiment of the present invention.

Another specific implementation solution of the present invention is described in detail in an embodiment of the present invention, which is shown in FIG. 5:

501: A first terminal sends a hosting request to a hosting server, where the hosting request includes a MAC address, a password, an IP (Internet Protocol, Internet Protocol) address, an access point control port number of a first access point.

The hosting server is a server of a virtual network operator.

The hosting request may further include a fund account, a hosting time period, a network traffic threshold, and the like. In addition, the password of the first access point may be encrypted.

502: The hosting server detects, according to the IP address, the MAC address, and the control port number of the first access point, whether the first access point satisfies a basic condition for hosting; and if the basic condition for hosting is not satisfied, performs a software upgrade configuration on the access point.

In an embodiment of the present invention, the hosting server detects, according to the IP address, the MAC address, and the control port number of the first access point, whether a software version of the access point satisfies a hosting requirement.

503: The hosting server starts a periodical password updating mechanism.

The periodical password updating mechanism is to update the password of the first access point according to a preset time interval, and send a new password of the first access point to the first terminal, so that the first terminal performs synchronous update.

504: A second terminal searches for a network, and finds a network of a second access point; and the second terminal sends, to the hosting server, a request for joining the network of the second access point, where the request includes a MAC address of the second access point.

The second terminal is an access point application terminal. Before sending, to the hosting server, the request for joining the network of the second access point, the second terminal needs to be registered with and log in to a hosting system.

The first access point may be the same as or may be different from the second access point.

505: The hosting server determines whether the second access point is in a hosting state according to the MAC address of the second access point, and if the second access point is in the hosting state, sends a password of the second access point to the second terminal.

The determining whether the second access point is in a hosting state includes: determining whether the second access point is within a hosting time period, and whether used network traffic reaches a network traffic threshold. When the second access point is within the hosting time period and the used network traffic does not reach the network traffic threshold, the second access point is in the hosting state.

506: The second terminal accesses the network of the second access point according to the password sent by the hosting server.

507: The hosting server adjusts configuration information of the second access point according to overall network status information.

The hosting server performs network optimization according to an overall network status, for example, delivers configuration information generated by the hosting server to the second access point, where the configuration information includes a channel change and the like.

508: The hosting server charges the second terminal according to network traffic, used by the second terminal, of the second access point.

A charging process includes: calculating, by the hosting server, amount payable according to the network traffic, used by the second terminal, of the second access point; then deducting the amount from a fund account of the second terminal; and calculating, by the hosting server from the deducted amount according to a preset allocation method, funds that should be paid to a user who applies to host the access point, and transferring the funds to the user who applies to host the second access point.

Figure 6:
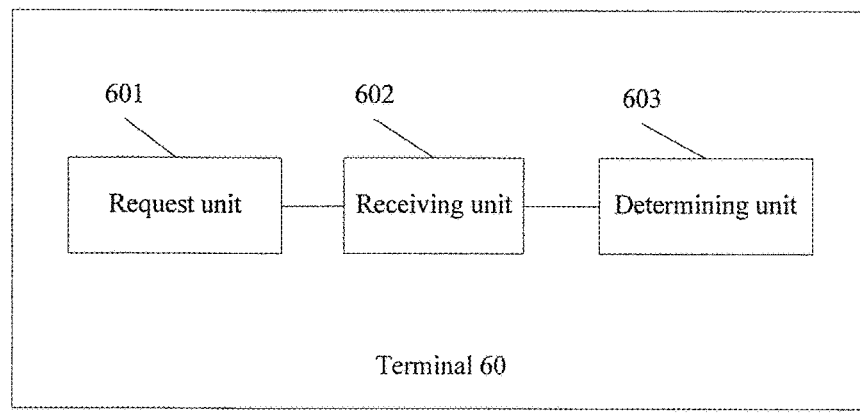
FIG. 6 shows a terminal for hosting a network access point according to an embodiment of the present invention.

The following describes a terminal 60 in an embodiment of the present invention according to FIG. 6. The terminal 60 includes: a request unit 601, a receiving unit 602, and a determining unit 603.

The request unit 601 is configured to initiate a hosting request to a server, where the hosting request includes an identifier of an access point needing to be hosted, so that the server authenticates the access point according to the identifier of the access point, and the hosting request is used to delegate operation permission of the access point to the server.

The receiving unit 602 is configured to receive an authentication result sent by the server.

The determining unit 603 is configured to: when the authentication result is that the authentication succeeds, determine that the hosting succeeds.

Figure 7:
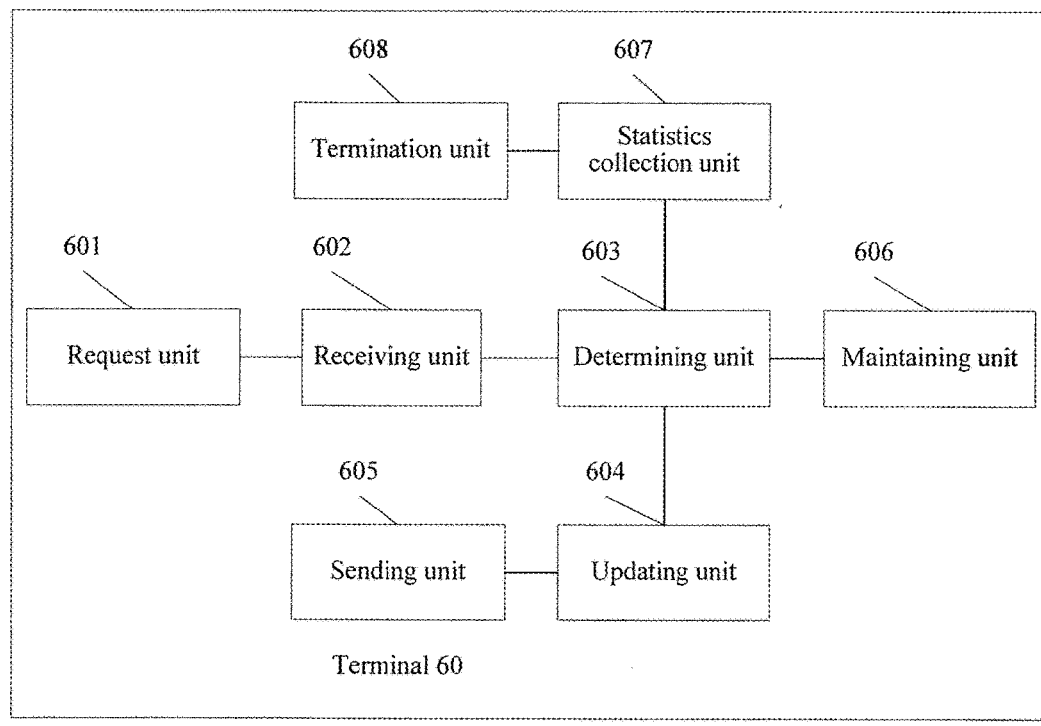
FIG. 7 shows a terminal for hosting a network access point according to another embodiment of the present invention.

As shown in FIG. 7, in another embodiment of the present invention, the hosting request further includes a first password, and the first password is used for access to the access point. Based on FIG. 6, optionally, the terminal 60 further includes an updating unit 604 and a sending unit 605.

The updating unit 604 is configured to: when the determining unit 603 determines that the hosting succeeds, acquire, according to a preset time interval, a second password used to update the first password, where the second password is used for access to the access point.

The sending unit 605 is specifically configured to send the identifier and the second password obtained by the updating unit 604 to the server, so that the server updates the first password according to the identifier and the second password.

The hosting request further includes a hosting time period; and the terminal 60 further includes a maintaining unit 606.

The maintaining unit 606 is configured to: when the determining unit 603 determines that the hosting succeeds, maintain a network sharing function of the access point in an enabled state, so that the server can manage the access point within the hosting time period.

The hosting request further includes a network traffic threshold; and the terminal 60 further includes a statistics collection unit 607 and a termination unit 608.

The statistics collection unit 607 is configured to: when the determining unit 603 determines that the hosting succeeds, collect statistics about network traffic shared by the access point.

The termination unit 608 is configured to: when the shared network traffic obtained by means of statistics collection by the statistics collection unit 607 is greater than or equal to the network traffic threshold, send a hosting stopping message to the server, so that the server stops managing the access point.

The hosting request further includes a fund account; and the receiving unit 602 is further configured to receive a feedback message sent by the server, where the feedback message includes a network traffic consumption volume and funds transferred to the fund account, and the funds are funds corresponding to the network traffic consumption volume.

It can be known from the above that, by means of the terminal provided in this embodiment of the present invention, the terminal initiates a hosting request to a server, where the hosting request includes an identifier, so that the server authenticates the access point according to the identifier of the access point; the terminal receives an authentication result sent by the server; and when the authentication result is that the authentication succeeds, the terminal determines that the hosting succeeds. The terminal hosts extra network traffic to the server for operating, which improves utilization of the network traffic, and also improves user experience.

Figure 8:
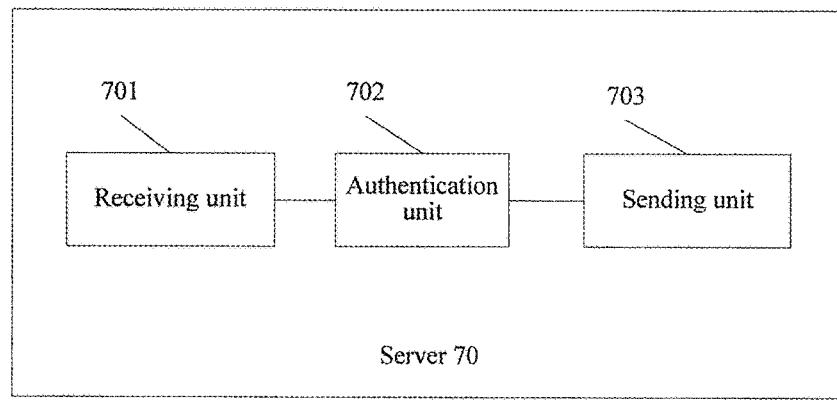
FIG. 8 shows a server for hosting a network access point according to an embodiment of the present invention.

The following describes a server 70 in an embodiment of the present invention according to FIG. 8. The server 70 includes: a receiving unit 701, an authentication unit 702, and a sending unit 703.

The receiving unit 701 is configured to receive a hosting request of a first terminal, where the hosting request includes an identifier of a first access point.

The authentication unit 702 is configured to authenticate the first access point according to the identifier of the first access point that is received by the receiving unit 701, and obtain an authentication result.

The sending unit 703 is configured to send the authentication result obtained by the authentication unit 702 to the first terminal.

Figure 9:
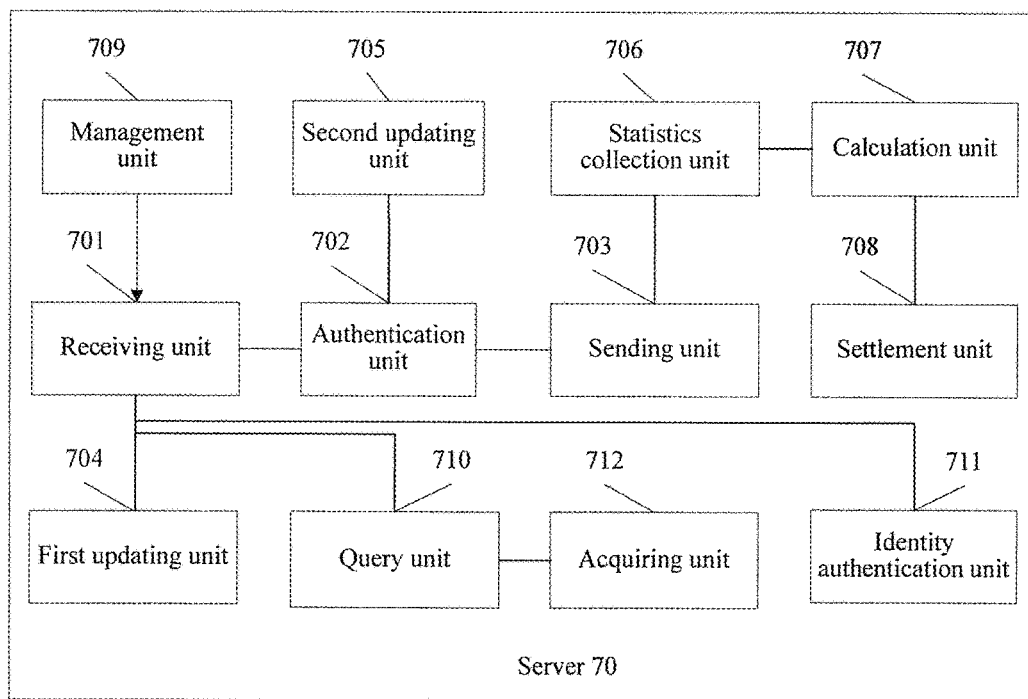
FIG. 9 shows a server for hosting a network access point according to another embodiment of the present invention.

In another embodiment of the present invention, the hosting request further includes a first password, and the first password is used for access to the access point. As shown in FIG. 9, based on FIG. 8, optionally, the server 70 further includes a first updating unit 704.

The receiving unit 702 is further configured to: when the authentication result obtained by the authentication unit 702 is that the authentication succeeds, and the sending unit 703 completes sending of the authentication result to the first access point, receive the identifier of the first access point and a second password that are sent by the first terminal according to a preset time interval.

The first updating unit 704 is configured to update the first password to the second password according to the identifier of the first access point that is received by the receiving unit 702.

Optionally, the server 70 further includes a second updating unit.

The second updating unit 705 is configured to: when the authentication result is that the authentication succeeds, and the sending unit 703 completes sending of the authentication result to the first access point, generate a second password according to a preset time interval, and update the first password of the access point to the second password.

Optionally, the hosting request further includes a fund account; and the server 70 further includes a statistics collection unit 706, a calculation unit 707, and a settlement unit 708.

The statistics collection unit 706 is configured to: when the sending unit 703 completes the sending of the authentication result to the first terminal, collect statistics about a network traffic consumption volume of the first access point.

The calculation unit 707 is configured to calculate funds that correspond to the network traffic consumption volume obtained by means of statistics collection by the statistics collection unit 706.

The settlement unit 708 is configured to transfer the funds calculated by the calculation unit 707 to the fund account, and send a message to the first terminal, where the message includes the network traffic consumption volume and the funds corresponding to the network traffic consumption volume.

Optionally, the hosting request further includes a hosting time period of the first access point and a network traffic threshold of the first access point; and the server 70 further includes a management unit 709.

The management unit 709 is configured to manage the access point according to at least one of the hosting time period of the first access point and the network traffic threshold of the first access point that are received by the receiving unit 701.

Optionally, the server 70 further includes a query unit 710.

The receiving unit 701 is further configured to receive a query request sent by a second terminal, where the query request includes an identifier of a second access point, the identifier of the second access point is an identifier of an access point needing to be accessed by the second terminal, and the first access point may be the same as or may be different from the second access point.

The query unit 710 is configured to query whether the identifier of the second access point that is received by the receiving unit 701 is in an available state, and obtain a query result.

The sending unit 703 is further configured to send the query result obtained by the query unit 710 to the second terminal.

Optionally, the query request further includes an account and a password of the second terminal; and the server 70 further includes an identity authentication unit 711.

The identity authentication unit 711 is configured to determine whether the second terminal is a registered user according to the account and the password of the second terminal that are received by the receiving unit 701.

The query unit 710 is specifically configured to: when the identity authentication unit 711 determines that the second terminal is a registered user, query, by the server, whether the identifier of the second access point is in the available state, and obtain the query result.

Optionally, the server further includes an acquiring unit 712.

The acquiring unit 712 is further configured to: when the query result obtained by the query unit 710 is that the identifier of the second access point is in the available state, acquire the password of the second access point.

The sending unit 703 is further configured to send the password of the second access point that is acquired by the acquiring unit 712 to the second terminal, so that the second terminal accesses a network of the second access point according to the identifier of the second access point and the password of the second access point.

Optionally, the query request further includes a fund account of the second terminal.

The statistics collection unit 706 is further configured to: when the sending unit completes sending of the password of the second access point to the second terminal, collect statistics about a network traffic consumption volume of the second terminal.

The calculation unit 707 is further configured to calculate, according to the network traffic consumption volume of the second terminal that is obtained by means of statistics collection by the statistics collection unit 706, funds needing to be paid by the second terminal.

The settlement unit 708 is further configured to deduct the funds that need to be paid by the second terminal and that are calculated by the calculation unit 707 from the fund account of the second terminal.

Optionally, the sending unit 703 is further configured to: when the authentication result obtained by the authentication unit 702 is that the authentication fails, send configuration information to the first terminal, so that the first terminal configures the access point according to the configuration information.

It can be known from the above that, by means of the server provided in this embodiment of the present invention, the server receives a hosting request of the first terminal, where the hosting request includes an identifier of an access point; the server authenticates the access point according to the identifier of the access point, and obtains an authentication result; and the server sends the authentication result to the access point. The terminal hosts extra network traffic to the server for operating, which improves utilization of the network traffic, and also improves user experience.

Figure 10:
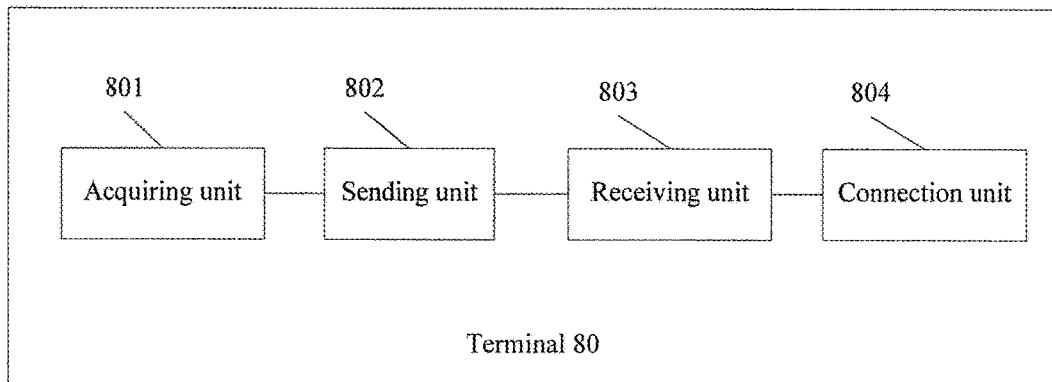
FIG. 10 shows a terminal for hosting a network access point according to another embodiment of the present invention.

The following describes a terminal 80 in an embodiment of the present invention according to FIG. 10. The terminal 80 includes: an acquiring unit 801, a sending unit 802, a receiving unit 803, and a connection unit 804.

The acquiring unit 801 is configured to acquire an identifier of an access point.

The sending unit 802 is configured to send a network access request message to a server, where the network access request message includes the identifier of the access point that is acquired by the acquiring unit 801, so that the server queries whether the access point is in an available state according to the identifier of the access point.

The receiving unit 803 is configured to receive a network access feedback message.

The connection unit 804 is configured to: when the network access feedback message received by the receiving unit 804 includes a password of the access point, connect to a network according to the identifier of the access point and the password of the access point.

Optionally, the network access request message includes a fund account.

The receiving unit 803 is further configured to: when the connection unit 804 completes a network connection, receive a statistics collection message sent by the server, where the statistics collection message includes a network traffic consumption volume of the terminal and an amount deducted from the fund account, and the amount is funds corresponding to the network traffic consumption volume.

It can be known from the above that, by means of the terminal provided in this embodiment of the present invention, a user can use a terminal to search, at any time, for an identifier of an access point needing to be accessed, send a network access request message to the server according to the identifier of the access point, and join a network by using a password fed back by the server, which therefore facilitates a life of the user, and improves user experience.

Figure 11:
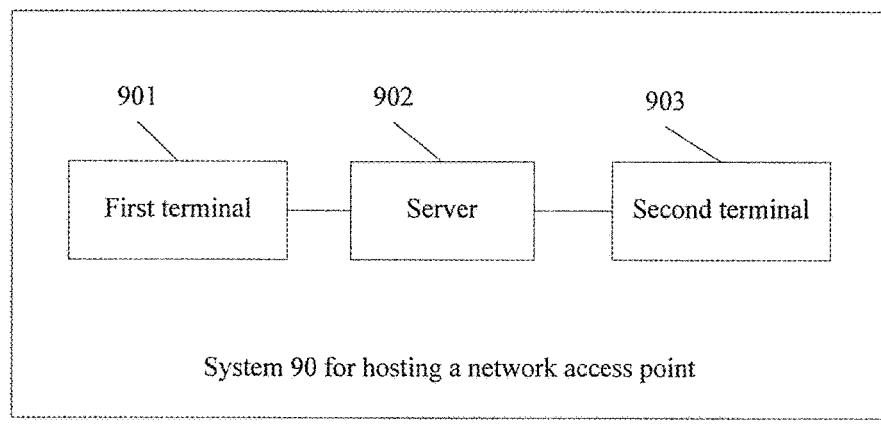
FIG. 11 shows a system for hosting a network access point according to another embodiment of the present invention.

The following describes a system 90 for hosting a network access point in an embodiment of the present invention according to FIG. 11. The system includes a first terminal 901 shown in FIG. 5 or FIG. 6, a server 902 shown in FIG. 7 or FIG. 8, and a second terminal 903 shown in FIG. 9.

Figure 12:
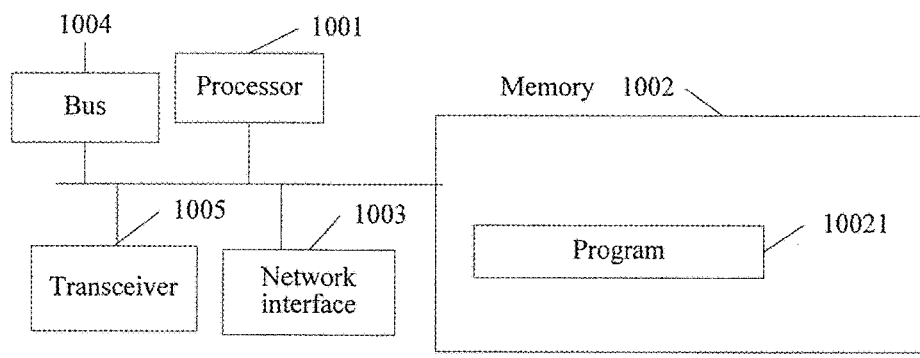
FIG. 12 shows a terminal for hosting a network access point according to another embodiment of the present invention.

FIG. 12 describes a structure of a terminal according to another embodiment of the present invention, including at least one processor 1001 (for example, a CPU), a memory 1002, at least one network interface 1003, at least one communications bus 1004, and at least one transceiver 1005, configured to implement connections and communication between these apparatuses. The processor 1001 is configured to execute an executable module stored in the memory 1002, for example, a computer program. The memory 1002 may include a high-speed random access memory (RAM: Random Access Memory), or may include a non-volatile memory (non-volatile memory), for example, at least one eMMC (Embedded Multi Media Card, embedded multimedia card) memory. A communication connection between the network device and at least one another network element is implemented by using the at least one network interface 1003 (which may be wired or wireless), where the Internet, a wide area network, a local network, or a metropolitan area network may be used.

In some implementation manners, the memory 1002 stores a program 10021, where the program 10021 may be executed by the processor 1001, and the program includes:

initiating a hosting request to a server, where the hosting request includes an identifier of an access point needing to be hosted, so that the server authenticates the access point according to the identifier of the access point, and the hosting request is used to delegate operation permission of the access point to the server;

receiving an authentication result sent by the server; and when the authentication result is that the authentication succeeds, determining that the hosting succeeds.

Optionally, the hosting request further includes a first password, and the first password is used for access to the access point;

after the determining that the hosting succeeds, the program further includes:

acquiring, according to a preset time interval, a second password used to update the first password, where the second password is used for access to the access point; and sending the identifier of the access point and the second password to the server, so that the server updates the first password according to the identifier of the access point and the second password.

Optionally, the hosting request further includes a hosting time period; and after the determining that the hosting succeeds, the program further includes:

maintaining a network sharing function of the access point in an enabled state within the hosting time period, so that the server can manage the access point within the hosting time period.

Optionally, the hosting request further includes a network traffic threshold; and after the determining that the hosting succeeds, the program further includes:

collecting statistics about network traffic shared by the access point; and when the shared network traffic is greater than or equal to the network traffic threshold, sending a hosting stopping message to the server, so that the server stops managing the access point.

Optionally, the hosting request further includes a fund account; and after the determining that the hosting succeeds, the program further includes:

receiving a feedback message sent by the server, where the feedback message includes a network traffic consumption volume and funds transferred to the fund account, and the funds are funds corresponding to the network traffic consumption volume.

It can be known from the above that, by means of the terminal provided in this embodiment of the present invention, the terminal initiates a hosting request to a server, where the hosting request includes an identifier, so that the server authenticates the access point according to the identifier of the access point; the terminal receives an authentication result sent by the server; and when the authentication result is that the authentication succeeds, the terminal determines that the hosting succeeds. The terminal hosts extra network traffic to the server for operating, which improves utilization of the network traffic, and also improves user experience.

Figure 13:
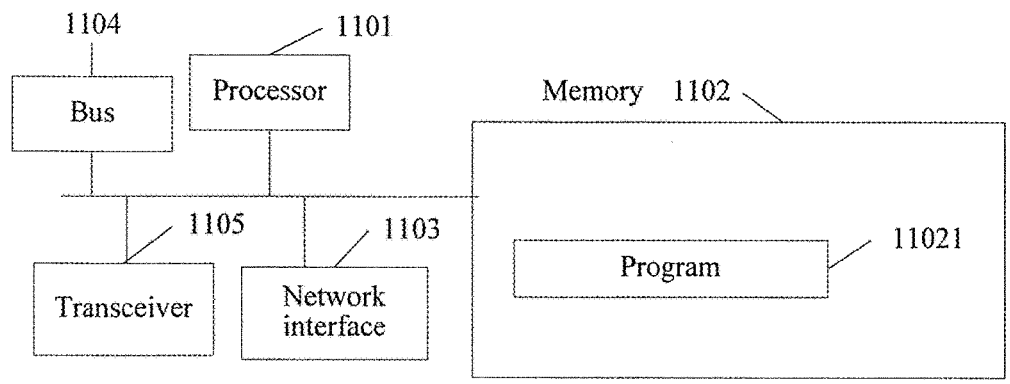
FIG. 13 shows a server for hosting a network access point according to another embodiment of the present invention.

FIG. 13 describes a structure of a server according to another embodiment of the present invention, including at least one processor 1101 (for example, a CPU), a memory 1102, at least one network interface 1103, at least one communications bus 1104, and at least one transceiver 1105, configured to implement connections and communication between these apparatuses. The processor 1101 is configured to execute an executable module stored in the memory 1102, for example, a computer program. The memory 1102 may include a high-speed random access memory (RAM: Random Access Memory), or may include a non-volatile memory (non-volatile memory), for example, at least one eMMC (Embedded Multi Media Card, embedded multimedia card) memory. A communication connection between the network device and at least one another network element is implemented by using the at least one network interface 1103 (which may be wired or wireless), where the Internet, a wide area network, a local network, or a metropolitan area network may be used.

In some implementation manners, the memory 1102 stores a program 11021, where the program 11021 may be executed by the processor 1101, and the program includes:

receiving a hosting request of a first terminal, where the hosting request includes an identifier of a first access point;

authenticating the first access point according to the identifier of the first access point, and obtaining an authentication result; and sending the authentication result to the first terminal.

Optionally, the hosting request further includes a first password, and the first password is used for access to the access point; and when the authentication result is that the authentication succeeds, after the sending the authentication result to the first terminal, the program further includes:

receiving the identifier of the first access point and a second password that are sent by the first terminal according to a preset time interval; and updating the first password to the second password according to the identifier of the first access point.

Optionally, the hosting request further includes a first password, and the first password is used for access to the access point; and when the authentication result is that the authentication succeeds, after the sending the authentication result to the first terminal, the program further includes:

generating a second password according to a preset time interval, and updating the first password of the first terminal to the second password.

Optionally, the hosting request further includes a fund account; and after the sending the authentication result to the first terminal, the program further includes:

collecting statistics about a network traffic consumption volume of the access point;

calculating funds corresponding to the network traffic consumption volume; and transferring the funds to the fund account, and sending a message to the first terminal, where the message includes the network traffic consumption volume and the funds corresponding to the network traffic consumption volume.

Optionally, the hosting request further includes at least one of a hosting time period of the first access point and a network traffic threshold of the first access point; and the program further includes:

managing the first access point according to the at least one of the hosting time period of the first access point and the network traffic threshold of the first access point.

Optionally, the program further includes: receiving a query request sent by a second terminal, where the query request includes an identifier of a second access point, the identifier of the second access point is an identifier of an access point needing to be accessed by the second terminal, and the first access point may be the same as or may be different from the second access point;

querying whether the identifier of the second access point is in an available state, and obtaining a query result; and sending the query result to the second terminal.

Optionally, the query request further includes an account and a password of the second terminal;

before the querying whether the identifier of the second access point is in an available state, and obtaining a query result, the program further includes:

determining whether the second terminal is a registered user according to the account and the password of the second terminal; and the querying, by the server, whether the second access point is in a hosting state according to the identifier of the second access point, and obtaining a query result includes:

when the second terminal is a registered user, querying whether the identifier of the second access point is in the available state, and obtaining the query result.

Optionally, after the obtaining a query result, the program further includes:

when the query result is that the identifier of the second access point is in the available state, acquiring the password of the second access point; and the sending the query result to the second terminal includes:

sending the password of the second access point to the second terminal, so that the second terminal accesses a network of the second access point according to the identifier of the second access point and the password of the second access point.

Optionally, the query request further includes a fund account of the second terminal; and after the sending the password of the second access point to the second terminal, the program further includes:

collecting statistics about a network traffic consumption volume of the second terminal;

calculating, according to the network traffic consumption volume of the second terminal, funds needing to be paid by the second terminal; and deducting the funds needing to be paid by the terminal from the fund account of the second terminal.

Optionally, when the authentication result is that the authentication fails, configuration information is sent to the first terminal, so that the first terminal configures the access point according to the configuration information.

It can be known from the above that, by means of the server provided in this embodiment of the present invention, the server receives a hosting request of the first terminal, where the hosting request includes an identifier of an access point; the server authenticates the access point according to the identifier of the access point, and obtains an authentication result; and the server sends the authentication result to the access point. The terminal hosts extra network traffic to the server for operating, which improves utilization of the network traffic, and also improves user experience.

Figure 14:
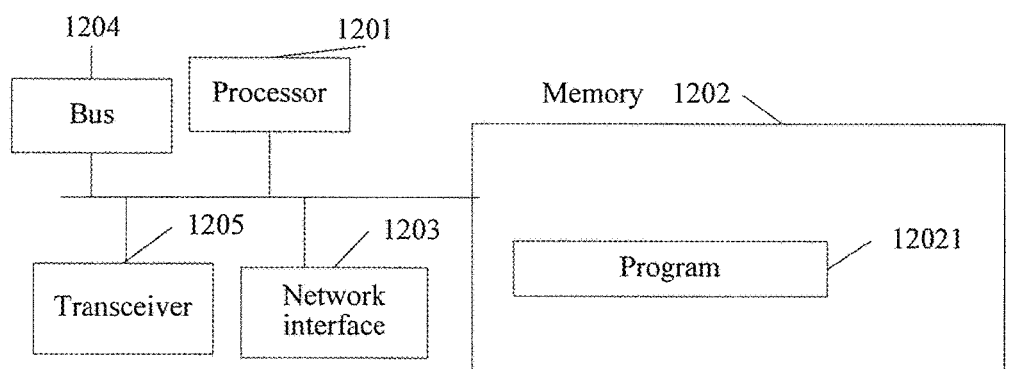
FIG. 14 shows a terminal for hosting a network access point according to another embodiment of the present invention.

FIG. 14 describes a structure of a terminal according to another embodiment of the present invention, including at least one processor 1201 (for example, a CPU), a memory 1202, at least one network interface 1203, at least one communications bus 1204, and at least one transceiver 1205, configured to implement connections and communication between these apparatuses. The processor 1201 is configured to execute an executable module stored in the memory 1202, for example, a computer program. The memory 1202 may include a high-speed random access memory (RAM: Random Access Memory), or may include a non-volatile memory (non-volatile memory), for example, at least one eMMC (Embedded Multi Media Card, embedded multimedia card) memory. A communication connection between the network device and at least one another network element is implemented by using the at least one network interface 1203 (which may be wired or wireless), where the Internet, a wide area network, a local network, or a metropolitan area network may be used.

In some implementation manners, the memory 1202 stores a program 12021, where the program 12021 may be executed by the processor 1201, and the program includes:

acquiring an identifier of an access point;

sending a network access request message to a server, where the network access request message includes the identifier of the access point, so that the server queries whether the access point is in an available state according to the identifier of the access point;

receiving a network access feedback message; and when the network access feedback message includes a password of the access point, connecting to a network according to the identifier of the access point and the password of the access point.

Optionally, the network access request message includes a fund account; and after the connecting to a network according to the identifier of the access point and the password, the program further includes:

receiving a statistics collection message sent by the server, where the statistics collection message includes a network traffic consumption volume of the terminal and an amount deducted from the fund account, and the amount is funds corresponding to the network traffic consumption volume.

It can be known from the above that, by means of the terminal provided in this embodiment of the present invention, a user can search, at any time by using the terminal, for an identifier of an access point needing to be accessed, send a network access request message to the server according to the identifier of the access point, and join a network by using a password fed back by the server, which therefore facilitates a life of the user, and improves user experience.

Figure 15:
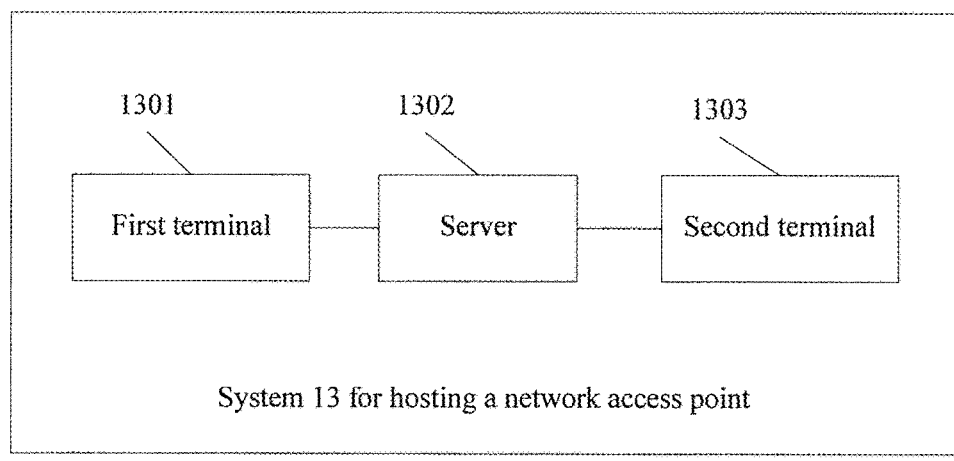
FIG. 15 shows a system for hosting a network access point according to another embodiment of the present invention.

FIG. 15 describes a structure of a system for hosting a network access point according to another embodiment of the present invention. The system includes a first terminal 1301 shown in FIG. 12, a server 1302 shown in FIG. 13, and a second terminal 1303 shown in FIG. 14.

It should be noted that, for brief description, the foregoing method embodiments are represented as a series of actions. However, a person skilled in the art should appreciate that the present invention is not limited to the described order of the actions, because according to the present invention, some steps may be performed in other orders or simultaneously. In addition, a person skilled in the art should also understand that the embodiments described in this specification all belong to exemplary embodiments, and the involved actions and modules are not necessarily mandatory to the present invention.

Content such as information exchange and an execution process between the modules in the apparatus and the system is based on a same idea as the method embodiments of the present invention. Therefore, for detailed content, refer to descriptions in the method embodiments of the present invention, and details are not described herein again.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM: Read-Only Memory), or a random access memory (RAM: Random Access Memory).

Specific examples are used in this specification to describe the principle and implementation manners of the present invention. The descriptions of the foregoing embodiments are merely intended to help understand the method and idea of the present invention. In addition, with respect to the implementation manners and the application scope, modifications may be made by a person of ordinary skill in the art according to the idea of the present invention. Therefore, this specification shall not be construed as a limitation on the present invention.

What is claimed is:

1. A method for hosting a network access point, the method comprising:

initiating, by a terminal, a hosting request to a server, wherein the hosting request comprises an identifier of an access point needing to be hosted and a fund account, the hosting request for triggering the server to authenticate the access point according to the identifier of the access point, and for delegating operation permission of the access point to the server;

receiving, by the terminal, an authentication result sent by the server;

determining, by the terminal, that the hosting succeeds when the authentication result is that the authentication succeeds; and after determining, by the terminal, that the hosting succeeds, the method further comprises:

receiving, by the terminal, a feedback message sent by the server, wherein the feedback message comprises a network traffic consumption volume and funds transferred to the fund account, and the funds are funds corresponding to the network traffic consumption volume.

2. The method according to claim 1, wherein:

the hosting request further comprises a first password for accessing the access point; and after determining, by the terminal, that the hosting succeeds, the method further comprises:

acquiring, by the terminal according to a preset time interval, a second password for updating the first password, the second password for accessing the access point, and sending, by the terminal, the identifier of the access point and the second password to the server, to enable the server to update the first password according to the identifier of the access point and the second password.

3. The method according to claim 1, wherein:

the hosting request further comprises a hosting time period; and after determining, by the terminal, that the hosting succeeds, the method further comprises:

maintaining, by the terminal, a network sharing function of the access point in an enabled state within the hosting time period, to enable the server to manage the access point within the hosting time period.

4. The method according claim 1, wherein:

the hosting request further comprises a network traffic threshold; and after determining, by the terminal, that the hosting succeeds, the method further comprises:

collecting, by the terminal, statistics about network traffic shared by the access point, and sending, by the terminal, a hosting stopping message to the server, to enable the server to stop managing the access point when the shared network traffic obtained by means of statistics collection is greater than or equal to the network traffic threshold.

5. A method for hosting a network access point, the method comprising:
- receiving, by a server, a hosting request of a first terminal, wherein the hosting request comprises an identifier of a first access point and a fund account;
- authenticating, by the server, the first access point according to the identifier of the first access point, and obtaining an authentication result;
- sending, by the server, the authentication result to the first terminal; and
- after sending, by the server, the authentication result to the first terminal, the method further comprises:
  - collecting statistics about a network traffic consumption volume of the first access point,
  - calculating funds corresponding to the network traffic consumption volume, and
  - transferring the funds to the fund account, and sending a message to the first terminal, wherein the message comprises the network traffic consumption volume and the funds corresponding to the network traffic consumption volume.

6. The method according to claim 5, wherein:
the hosting request further comprises a first password for accessing the access point; and
when the authentication result is that the authentication succeeds, after sending, by the server, the authentication result to the first terminal, the method further comprises:
- receiving, by the server, the identifier of the first access point and a second password that are sent by the first terminal according to a preset time interval, and
- updating, by the server, the first password to the second password according to the identifier of the first access point.

7. The method according to claim 5, wherein:
the hosting request further comprises a first password for accessing the access point; and
after sending, by the server, the authentication result to the first terminal when the authentication result is that the authentication succeeds, the method further comprises:
- generating, by the server, a second password according to a preset time interval, and updating the first password of the first terminal to the second password.

8. The method according to claim 5, wherein:
the hosting request further comprises at least one of a hosting time period of the first access point and a network traffic threshold of the first access point; and
the method further comprises:
- managing, by the server, the first access point according to the at least one of the hosting time period of the first access point and the network traffic threshold of the first access point.

9. The method according to claim 5, further comprising:
receiving, by the server, a query request sent by a second terminal, wherein the query request comprises an identifier of a second access point, the identifier of the second access point is an identifier of an access point needing to be accessed by the second terminal, and the first access point may be the same as or may be different from the second access point;
querying, by the server, whether the identifier of the second access point is in an available state, and obtaining a query result; and
sending, by the server, the query result to the second terminal.

10. The method according to claim 9, wherein:
the query request further comprises an account and a password of the second terminal;
before querying, by the server, whether the identifier of the second access point is in an available state, and obtaining a query result, the method further comprises:
- determining, by the server, whether the second terminal is a registered user according to the account and the password of the second terminal; and
querying, by the server, whether the second access point is in a hosting state according to the identifier of the second access point, and obtaining a query result comprises:
- querying, by the server, whether the identifier of the second access point is in the available state, and obtaining the query result when the second terminal is a registered user.

11. The method according to claim 9, wherein:
after obtaining a query result, the method further comprises:
- acquiring, by the server, the password of the second access point when the query result is that the identifier of the second access point is in the available state; and
sending, by the server, the query result to the second terminal comprises:
- sending, by the server, the password of the second access point to the second terminal, so that the second terminal accesses a network of the second access point according to the identifier of the second access point and the password of the second access point.

12. The method according to claim 11, wherein:
the query request further comprises a fund account of the second terminal; and
after sending, by the server, the password of the second access point to the second terminal, the method further comprises:
- collecting, by the server, statistics about a network traffic consumption volume of the second terminal,
- calculating, according to the network traffic consumption volume of the second terminal, funds needing to be paid by the second terminal, and
- deducting the funds needing to be paid by the second terminal from the fund account of the second terminal.

13. The method according to claim 5, further comprising:
sending, by the server, configuration information to the first terminal, to enable the first terminal to configure the first access point according to the configuration information when the authentication result is that the authentication fails.

14. A terminal, comprising:
a processor; and
a memory configured to store instructions that, when executed by the processor, cause the terminal to:
- initiate a hosting request to a server, wherein the hosting request comprises an identifier of an access point needing to be hosted and a fund account,
- trigger the server to authenticate the access point according to the identifier of the access point, the hosting request for delegating operation permission of the access point to the server,
- receive an authentication result sent by the server,
- determine that the hosting request succeeds when the authentication result is that the authentication succeeds, and receive a feedback message sent by the server, wherein the feedback message comprises a network traffic consumption volume and funds transferred to the fund account, and the funds are funds corresponding to the network traffic consumption volume.

15. The terminal according to claim 14, wherein:
the hosting request further comprises a first password for accessing the access point; and
the instructions, when executed by the processor, cause the terminal to:
   acquire, according to a preset time interval, a second password for updating the first password when the terminal determines that the hosting request succeeds, the second password for accessing the access point, and
   send the identifier and the second password to the server, to enable the server to update the first password according to the identifier and the second password.

16. The terminal according to claim 14, wherein:
the hosting request further comprises a hosting time period; and
the instructions, when executed by the processor, cause the terminal to:
   maintain a network sharing function of the access point in an enabled state, when the terminal determines that the hosting request succeeds, to enable the server to manage the access point within the hosting time period.

17. The terminal according to claim 14, wherein:
the hosting request further comprises a network traffic threshold; and
the instructions, when executed by the processor, cause the terminal to:
   collect statistics about network traffic shared by the access point when the terminal determines that the hosting request succeeds, and
   send a hosting stopping message to the server, to enable the server to stop managing the access point when the shared network traffic is greater than or equal to the network traffic threshold.

18. A server comprising:
a processor; and
a memory configured to store instructions that, when executed by the processor, cause the server to:
   receive a hosting request of a first terminal, wherein the hosting request comprises an identifier of a first access point and a fund account,
   authenticate the access point according to the identifier of the first access point, and obtain an authentication result,
   send the authentication result to the first terminal;
   collect statistics about a network traffic consumption volume of the first access point when the server completes the sending of the authentication result to the first terminal,
   calculate funds that correspond to the network traffic consumption volume, and
   transfer the funds to the fund account, and send a message to the first terminal, wherein the message comprises the network traffic consumption volume and the funds corresponding to the network traffic consumption volume.

19. The server according to claim 18, wherein the instructions, when executed by the processor, cause the server to:
receive the identifier of the access point and a second password that are sent by the first terminal according to a preset time interval when the authentication result is that the authentication succeeds, and the server completes sending of the authentication result to the first terminal, and
update a first password to the second password according to the identifier of the first access point.

20. The server according to claim 18, wherein the instructions, when executed by the processor, cause the server to:
generate a second password according to a preset time interval, and update a first password of the first terminal to the second password when the authentication result is that the authentication succeeds, and the server completes sending of the authentication result to the first terminal.

21. The server according to claim 18, wherein:
the hosting request further comprises at least one of a hosting time period of the first access point and a network traffic threshold of the first access point; and
the instructions, when executed by the processor, cause the server to:
   manage the access point according to the at least one of the hosting time period of the first access point and the network traffic threshold of the first access point.

22. The server according to claim 18, wherein the instructions, when executed by the processor, cause the server to:
receive a query request sent by a second terminal, wherein the query request comprises an identifier of a second access point, the identifier of the second access point is an identifier of an access point needing to be accessed by the second terminal, and the first access point may be the same as or may be different from the second access point;
query whether the identifier of the second access point is in an available state, and obtain a query result; and
send the query result to the second terminal.

23. The server according to claim 22, wherein:
the query request further comprises an account and a password of the second terminal; and
the instructions, when executed by the processor, cause the server to:
   determine whether the second terminal is a registered user according to the account and the password of the second terminal, and
   query whether the identifier of the second access point is in the available state, and obtain the query result when the server determines that the second terminal is a registered user.

24. The server according to claim 22, wherein the instructions, when executed by the processor, cause the server to:
acquire the password of the second access point when the query result is that the identifier of the second access point is in the available state; and
send the password of the second access point to the second terminal, to enable the second terminal to access a network of the second access point according to the identifier of the second access point and the password of the second access point.

25. The server according to claim 24, wherein:
the query request further comprises a fund account of the second terminal; and
the instructions, when executed by the processor, cause the server to:
   collect statistics about a network traffic consumption volume of the second terminal when the server completes sending of the password of the second access point to the second terminal, calculate, according to the network traffic consumption volume of the second terminal, funds needing to be paid by the second terminal, and deduct the funds that need to be paid by the second terminal from the fund account of the second terminal.

26. The server according to claim 18, wherein the instructions, when executed by the processor, cause the server to:

send configuration information to the first terminal, when the authentication result is that the authentication fails, to enable the first terminal to configure the first access point according to the configuration information.

* * * * *